United States Patent

Winther et al.

Patent Number: 5,598,971
Date of Patent: Feb. 4, 1997

[54] HUMIDITY CONTROL SYSTEM

[75] Inventors: Dale E. Winther, La Crescenta; Robert H. Killen, Pasadena, both of Calif.

[73] Assignee: Bevles Company, Inc., Chino, Calif.

[21] Appl. No.: 516,097

[22] Filed: Aug. 17, 1995

[51] Int. Cl.$^6$ .............................. B01F 3/02; G05D 21/00
[52] U.S. Cl. .......................... 236/44 A; 62/3.4; 73/335.04
[58] Field of Search ..................... 62/3.4, 176.6, 62/176.1; 236/44 A, 44 E; 73/335.04, 335.08

[56] References Cited

U.S. PATENT DOCUMENTS

| | | | |
|---|---|---|---|
| 4,237,623 | 12/1980 | Timm et al. | 34/196 |
| 4,446,780 | 5/1984 | Puvogel et al. | 99/480 |
| 4,605,840 | 8/1986 | Koopman | 219/401 |
| 5,343,735 | 9/1994 | Succi et al. | 73/335.03 X |

FOREIGN PATENT DOCUMENTS 2205957  12/1988  United Kingdom ................ 73/335.03

*Primary Examiner*—William E. Waynes
*Attorney, Agent, or Firm*—Hecker & Harriman

[57] ABSTRACT

The present invention provides a capacitive humidity transducer based humidity control system. The present invention comprises a humidity sensor, a temperature source for the heated cabinet air, a temperature source at the sensor, and a regulated water mist discharged into the cabinet air circulation system. An electronic system combines the input from the sensor, the temperature inputs, and the humidity percentage setting to regulate the timing and duration of the water mist discharge, thereby allowing to adjust percentage of humidity in heated holding cabinets. The sensor is a capacitor comprising two plates in close proximity but insulated from each other. The electrical output of the capacitor is sensitive to moisture on the surfaces between the plates. By cooling one plate until it reaches its dew point, the signal is detected and received by the electronic system. Cooling of the capacitor plate is accomplished by means of a thermoelectric cooler. When cabinet humidity falls below a predetermined threshold value and a corresponding change in capacitance of the capacitive sensor is detected, the humidity control system turns on a water mister to spray water into cabinet air flow until a desired relative humidity level is reached in the heated cabinet.

21 Claims, 3 Drawing Sheets

HUMIDITY CONTROL SYSTEM

BACKGROUND OF THE INVENTION

1. Field of the Invention

This invention relates to relative humidity control instruments and in particular to an electronic humidity control system with capacitive humidity sensor.

2. Background Art

Heated holding cabinets for maintaining food in a heated or warm condition are commonly employed in restaurants, hotels, fast-food chains, and the like. Typically, the food is prepared or cooked in advance of its serving or sale and then stored in heated holding cabinets until needed. The holding cabinets are used to keep the food warm, and often moist, without cooking the food.

In some heated holding cabinets, means are not provided for varying the amount of moisture in the cabinet. It is desirable to control the amount of moisture in the heated, circulating air since the ideal moisture level varies from food to food. For example, where a crisp food is to be stored, less moisture or no moisture is required, whereas for moist foods greater amounts of moisture are required.

In the past, heated holding cabinets often employed water pans for adding moisture to the circulating air. These pans are filled at a sink, or the like, and then placed in the heated cabinet. Water is frequently spilled from these pans during transportation from water source to oven. With a water pan, the humidity of a cabinet can be controlled by adjusting the area of water exposed to heat. With the heated cabinet, a baffle member is employed within a water pan to substantially lessen the chance of water spillage; moreover, the baffle member provides control over the amount of moisture absorbed by the circulating air. It is difficult to control the cabinet humidity to an acceptable accuracy using this scheme.

Although these cabinets are equipped with a temperature control system, they usually are not equipped with an adequate humidity control system. Different food products require different storage conditions and accordingly different storage humidity. Thus cabinet humidity as well as cabinet temperature need to be controlled to provide adequate storage for food products.

Other prior art humidity control techniques include RH (relative humidity) sensors such as the one supplied by WATLOW CONTROLS in Winona, Minn. These sensors are only guaranteed up to 140° F. and are fragile at temperatures above 140° F. In the temperature range above 200° F., these devices will be damaged and will not be able to operate to their specifications. This is a disadvantage because the operating range of most heated cabinets is from 140° F. to 210° F.

A capacitive humidity transducer which has an improved physical construction is disclosed by Suntola in U.S. Pat. No. 4,164,868. The primary problem with capacitive transducers prior to Suntola was that the dielectric film structure expanded and contracted during changes in water absorption and thus assumed a wavy rather than a planar shape. Thus, the dielectric film thickness could not be precisely determined. Suntola uses a base which carries at one of its surfaces a pair of electrically conductive coatings which are spaced from each other. The dielectric film is carried also by the surface of the base which carries the coatings, thereby making it possible to accurately determine the thickness of the dielectric film, and hence to accurately determine changes in the capacitance value of the capacitive humidity transducer.

Suntola does not disclose or suggest cooling one of the plates in the sensing capacitor. Further dew formation at high ambient temperatures is very difficult in the system of Suntola. Moreover, Suntola does not address measuring changes in capacitance due to ambient moisture. Suntola merely discloses new structure for a capacitive humidity transducer, without disclosing any means for measuring changes in capacitance.

U.S. Pat. No. 3,350,941 to Misevich et al. discloses a capacitance humidity sensing element. The element has a moisture insensitive, nonmetallic core having a high electrical resistivity and a low dielectric constant. Thin layers of coatings of a dielectric, highly moisture sensitive material are located on opposite surfaces of the core and are capable of absorbing water. The function of the moisture sensitive outer layers is to increase the sensitivity of the element, particularly at low humidity. The capacitance of the element is related to the partial water vapor pressure by virtue of the value of the dielectric constant of the moisture sensitive layers. The effective dielectric constant increases as the moisture content of the air increases, thus increasing the capacitance of the sensing element. The humidity sensing element is connected across a modified Wien bridge and the output of the bridge is connected through an amplifier to a volt meter which is calibrated to indicate the humidity.

Misevich does not disclose or suggest cooling one of the plates in the sensing capacitor. Accordingly, Misevich relies on absorption of moisture by the highly moisture sensitive material instead of a plate of the capacitor. Dew formation at high ambient temperatures is very difficult in the system of Misevich. Moreover, in Misevich, the change in capacitance is measured by a modified Wien bridge.

U.S. Pat. No. 5,272,963 to Del Fabbro discloses an arrangement for measuring moisture in ovens. Del Fabbro uses a temperature differential between two plates. Water vapor condenses on one of the two plates, causing the temperature differential. Del Fabbro does not disclose or suggest a sensing capacitor.

U.S. Pat. No. 5,365,039 to Chaudoir discloses a humidity controlled food warmer including a monitoring circuit. The monitoring circuit includes two capacitors. Chaudoir does not disclose or suggest a capacitor for sensing temperature based on formation of dews on a cool plate.

Thus, presently, a variety of apparatus and methods are employed to provide an adequate climate control for heated holding cabinets. However, these have not enjoyed wide spread acceptance, possibly due to their high costs and susceptibility at high temperatures. Accordingly, it would be appreciated to provide a humidity control system which is not only effective over a wider range of temperatures, but cost-effective and flexible enough to be installed in a variety of heated holding cabinets with different structural and climatic requirements.

SUMMARY OF THE INVENTION

The present invention provides a capacitive humidity transducer based humidity control system. The present invention comprises a humidity sensor, a temperature sensor for the cabinet air, a temperature sensor at the humidity sensor, and a regulated water mist discharged into the cabinet air circulation system. An electronic system combines the input from the humidity sensor, the temperature inputs, and the humidity percentage setting to regulate the timing and duration of the water mist discharge, thereby allowing automatic control of the percentage of humidity in heated holding cabinets.

The sensor is a capacitor comprising two plates in close proximity but insulated from each other. The electrical output of the capacitor is sensitive to moisture on the surfaces between the plates. By cooling one plate until moisture forms, the dew point is detected by sensing the sudden increase in capacitance. Cooling of the capacitor plate is accomplished by a cooling means such as a thermoelectric cooler or the like. The cold side of the thermoelectric cooler is attached to cool the capacitor plate. The hot side is attached to the frame of the cabinet top mount unit where it dissipates its heat.

The control system monitors the capacitor temperature and compares it with ambient temperature to obtain relative humidity in the heated holding cabinet. If the relative humidity in the heated holding cabinet is below a desired value, the humidity control system turns on a water mister to spray water into the cabinet air flow to increase the cabinet's relative humidity to a desired level.

DETAILED DESCRIPTION OF THE INVENTION

The present invention is a humidity control system described with respect to heated holding cabinets. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

Heated holding cabinets are commonly used to provide transportation or storage means for food to maintain food in a heated or warm condition for an extended period of time. The heated holding cabinets are usually equipped with a temperature control system to keep the cabinet temperature optimal for stored food inside the cabinets.

To provide an adequate storage condition for a variety of food products, it is essential for heated holding cabinets to provide not only a temperature control but also a humidity control to meet different temperature and humidity requirements for different food products. The invented humidity control system, thus, is designed to provide a humidity control means for varying the moisture in the circulating, heated air in heated holding cabinets.

In the preferred embodiment, the humidity control system of the present invention uses a novel humidity sensor designed to operate at cabinet temperatures up to the boiling point of the water. The present invention is microcontroller based, thereby providing a flexible and adjustable humidity control system. For example, actual operation temperature range can be expanded by conveniently changing microcontroller program parameters. One of the benefits of the present invention is cost advantage obtained by the simple material and structural requirements of the novel capacitive humidity transducer.

In the presently preferred embodiment the heated holding cabinet is fabricated substantially from stainless steel, however, other metals such as aluminum may be employed. Commonly employed sheet metal techniques are utilized in the fabrication of the heated cabinet.

Figure 1:
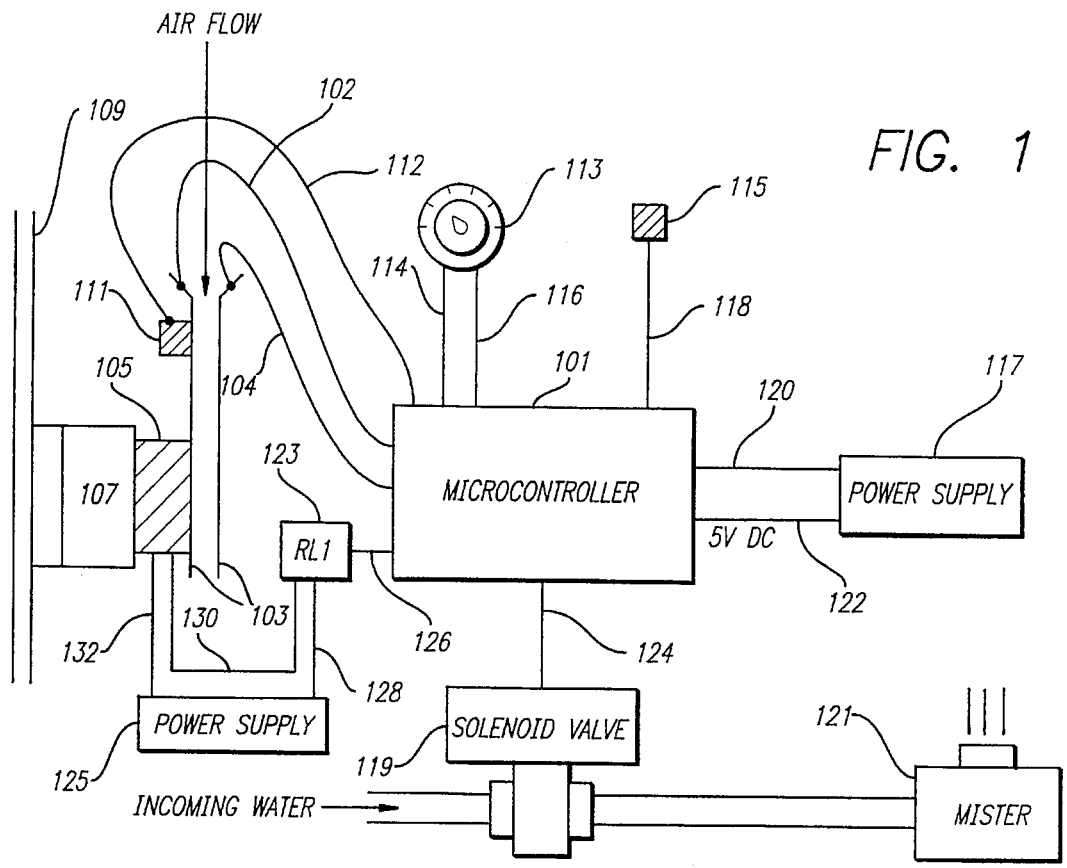
FIG. 1 is a schematic diagram of a humidity control system of the present invention.

FIG. 1 illustrates a schematic diagram of a humidity control system of the present invention. In FIG. 1, a sensor is used to measure humidity at high temperatures. This sensor is a capacitive humidity sensor and comprises a capacitor and a thermoelectric cooler attached thereto. When a current flows through a Peltier effect thermoelectric module, the module can be heated or cooled depending on the direction of the current flowing through the module, thereby making it possible to use a control current to obtain cooling or heating effect. In the system shown in FIG. 1, a Peltier effect thermoelectric module is used as thermoelectric cooler to cool the capacitor surface until the air flowing through it reaches its dew point and condenses, forming dew on the surface. An electronic circuit detects the capacitance change induced by dew formation and provides an input for a digital control system.

Alternatively, any other suitable means can be used to cool the capacitive humidity sensor. For example, running water past one plate of the capacitor can effectively cool the humidity sensor to a desired temperature range. Then the volume of water flow on the capacitor can be adjusted to control the cooling rate by using such techniques as intermittent water discharge or water spray system.

Referring to FIG. 1, microcontroller 101 is coupled to capacitor 103 through lines 102 and 104. One plate of capacitor 103 has thermocouple 111 attached thereto and is connected to thermoelectric cooler 105. Air is allowed to flow between the two plates of capacitor 103. Thermoelectric cooler 105 is coupled to cabinet frame 109 through heat sink 107. Thermoelectric cooler 105 is also coupled to relay RL1 123 through line 130 and to power supply 125 through line 132. Power supply 125 is coupled through line 128 to RL1, which is coupled to microcontroller 101 through line 126. Relative humidity control knob 113 is coupled to microcontroller 101 through lines 114 and 116 to allow a user to set a desired level of humidity in the cabinet. Alternatively, set keys can be used instead of a control knob to control the cabinet humidity.

Microcontroller 101 monitors the cabinet temperature by reading thermocouple 115 input through line 118. Power supply 117 provides DC 5 V power to microcontroller 101 through lines 120 and 122. Microcontroller 101 controls the relative humidity in the cabinet by switching on and off solenoid valve 119 through line 124 and controlling water flow to mister 121, which sprays water into the cabinet air flow to increase the cabinet humidity.

Figure 2:
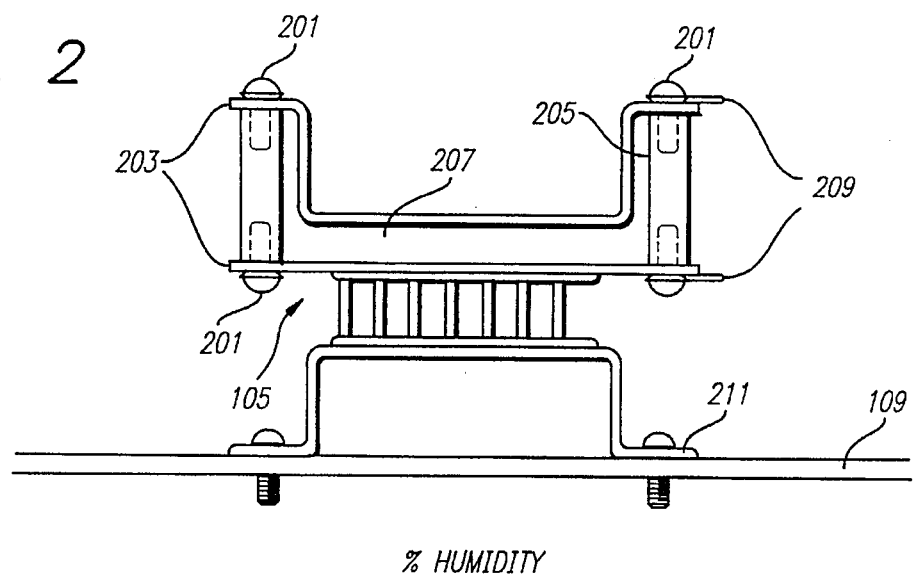
FIG. 2 is a plan view of the preferred embodiment of humidity capacitor assembly.

FIG. 2 shows a plan view of humidifier capacitor assembly. Humidity capacitor comprises conductive plates 203, which are separated by air gap of approximately 1/16 of an inch. The humidity capacitor is shown consisting of a thermoelectric cooler and a capacitor. In the preferred embodiment of the present invention, plates 203 are made of aluminum to take advantage of its superior heat transfer characteristics. Plates 203 are bolted together to lexan spacers 205 by screw bolts 201. Lexan spacers 205 are electrically insulating. As can be seen in FIG. 2, capacitor plates 203 have a special geometry to allow approximately 5 pF resolution. Although the preferred embodiment shown in FIG. 2 uses air gap as dielectric material, other suitable dielectric materials may be used to accommodate different capacitance range or sensitivity as required by the design specifications of heated holding cabinets.

Capacitor leads 209 are used to provide connections between capacitor 203 and microcontroller 103. The thermoelectric cooler is generally referred to by numeral 105 in FIG. 2. Thermoelectric cooler 105 has a thermoelectric material sandwiched between two ceramic panels. One side of thermoelectric cooler 105 is attached to bottom plate of capacitor 203 while the other side is attached to copper plate 211, thereby cooling the bottom capacitor plate and heating copper plate 211. Copper plate 211 is mounted on frame of cabinet top mount unit 109, which provides heat sink.

A thermoelectric cooler transports heat from a low temperature reservoir to a high temperature one by passing an electric current through a junction of dissimilar materials. Three quantities are of interest in delivering an optimal thermoelectric cooling effect: the coefficient of performance, the heat pumping rate, and the maximum temperature difference that the cooler will produce. There are a number of competing thermoelectric cooler suppliers and a choice can be made to select one after considering a desired cooling speed, heated cabinet's heat sink capability and related costs. In the preferred embodiment of the present invention, a thermoelectric crystal is used as thermoelectric cooler.

Figure 3:
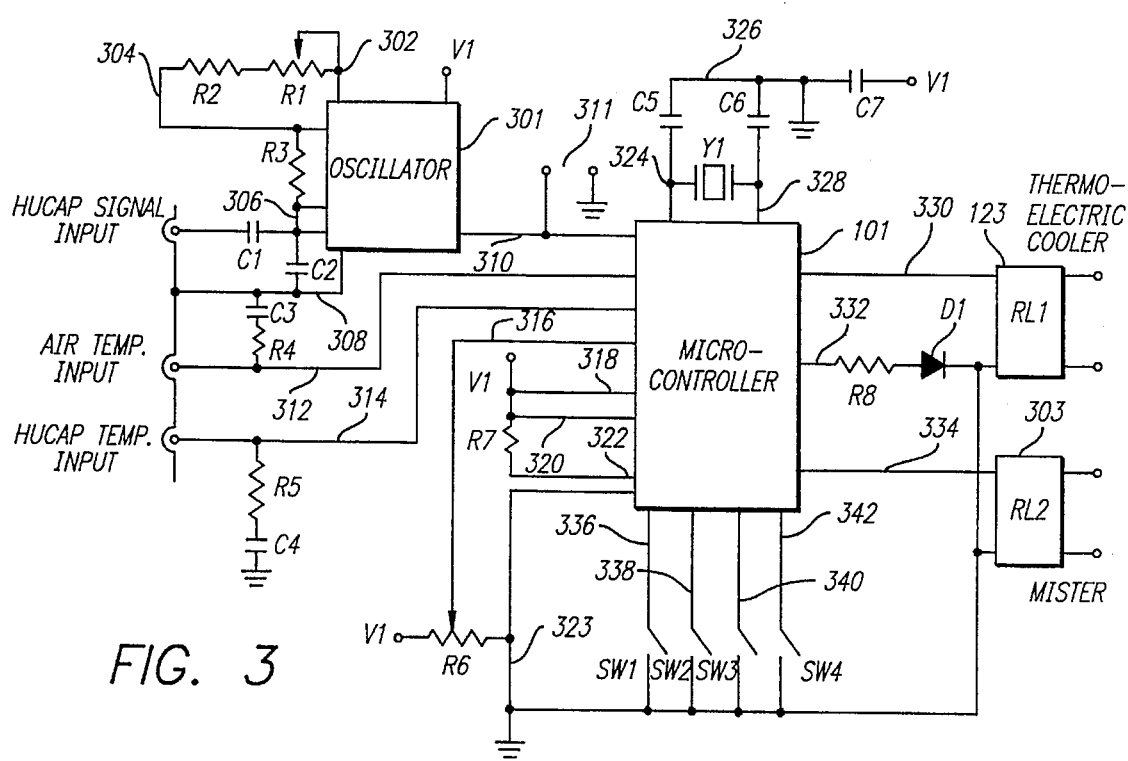
FIG. 3 is a schematic diagram of the preferred embodiment of humidity control system of the present invention.

FIG. 3 shows a schematic diagram of the preferred embodiment of the present invention. The electronic system shown in FIG. 3 is designed to provide a complete humidity control using two temperature measurements along with the humidity capacitor measurements. The humidity control system of the present invention is based on a programmable microcontroller chip, which can be implemented by readily available off-the-shelf products such as MICROCHIP Technology Inc.'s PIC16C71, a low-cost, small 18 pin DIP microchip. MICROCHIP PIC16C71 contains a microprocessor, memory, analog to digital converter and real-time clock. In another preferred embodiment according to the present invention, microcontroller 101 may be implemented by using discrete logic chips such as flipflops and logic gates. In yet another preferred embodiment, a portable computer such as a Personal Computer (PC) can replace the microcontroller to provide control functions including a human interface for the humidity control system.

Referring to FIG. 3, oscillator 301 is connected to microcontroller 101 through line 310, which carries oscillator 301 frequency. Oscillator 301 is coupled to power source V1. The frequency on line 310 can be monitored and tested at test point 311. Resistors R1 and R2 are connected to oscillator 301 in series through nodes 302 and 304. The frequency of oscillator 301 can be adjusted by changing the resistance of variable resistor R1. Node 304 is also coupled to resistor R3, which is coupled to node 306.

Humidity capacitor signal input is coupled to capacitor C1, which is coupled to node 306. Node 306 is also coupled to capacitor C2 and oscillator 301. Capacitor C2 is coupled to node 308, which is coupled to oscillator 301 and to capacitor C3. Capacitor C3 is coupled to resistor R4, which is coupled to node 312. An air temperature measurement input is coupled to node 312 and is provided to microcontroller 101. Humidity capacitor temperature input is coupled to node 314, which is coupled to microcontroller 101 and resistor R5. Resistor R5 is coupled to capacitor C4, which is connected to ground.

R6 is used to permit user adjustment of the desired humidity set-point. It provides a voltage level that is digitized and used by the microcontroller firmware. Power source V1 is coupled to R6, which is also coupled to node 323. Microcontroller 101 adjusts the resistance of variable resistor R6 through line 316. Power source V1 is coupled to R7, which is also coupled to microcontroller 101 through line 322. R7 is used to pull up an analog input of microcontroller 101. The analog input is used to initiate a test mode in microcontroller 101 firmware when grounded. Microcontroller 101 is coupled to power source V1 through lines 318 and 320.

Switches SW1, SW2, SW3, SW4 constitute a switching matrix to allow a human operator to set a desired dew threshold value. For example, if SW1 and SW3 are closed, and SW2 and SW4 open, microcontroller 101 will detect logical HIGHs in lines 338 and 342 and detect logical LOWs in lines 336 and 338, thereby reading in the desired setting in four bit digital data.

Y1 is a crystal oscillator coupled to microcontroller 101 through nodes 324 and 328, and provides an oscillation signal to microcontroller 101. Capacitor C5 is coupled to node 324 and node 326. Capacitor C6 is coupled to node 326 and node 328. Power source V1 is connected to node 326 through capacitor C7 to filter our AC components from the power source. Node 326 is also coupled to ground.

Microcontroller 101 is coupled to RL1 123 through line 330. Microcontroller 101 is also coupled to resistor R8 through line 332, which is coupled to LED (light-emitting-diode) D1. LED D1 is coupled to RL1 123 through node 323, which is also coupled to RL2 303 and ground. LED D1 is used to indicate control status. Microcontroller 101 also controls relay RL2 303 through line 334 to control water flow to mister 121.

Other methods can be used to increase cabinet humidity besides the mister in the present invention. For example, air with high moisture content can be introduced into a cooling chamber. The cooling chamber condenses excessive moisture out of the introduced air and reduces moisture content to a desired level. Depending upon the temperature of the cooling chamber, the amount of moisture reduction can be controlled. Then the air out of the cooling chamber can be fed into a heated holding cabinet to increase the cabinet humidity to an optimal level.

As can be seen in FIG. 3, the present invention provides a design that can be constructed with fewer hardware parts than prior art examples, thereby making it possible to reduce system production and maintenance costs while maintaining system flexibility and control accuracy.

Figure 4:
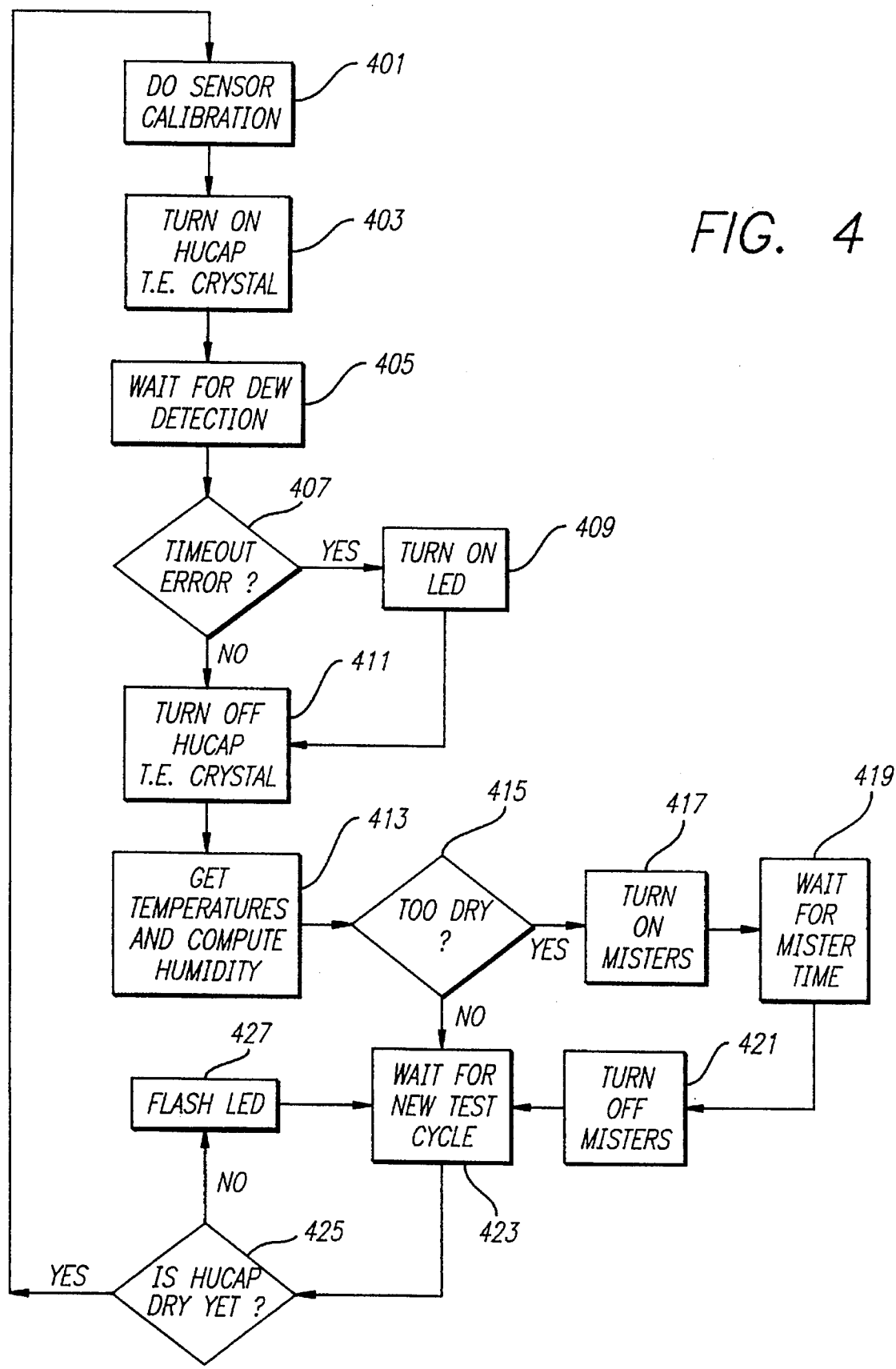
FIG. 4 is a flow diagram of humidity control routine of the present invention.

FIG. 4 illustrates a flow diagram of a section of microcode which controls the humidity control system of the present invention. Typically, the humidity control routine code is programmed and stored in non-volatile memory such as a ROM (Read Only Memory) in microcontroller 101. However, if desired, EEPROM (Electrically Erasable Electrically Programmable ROM) or EPROM (Electrically Programmable ROM) can be used as a program memory to add flexibility in the present invention. When a user needs to change part or all of humidity control programs or operating parameters after initial programming, EEPROM or EPROM will allow the user to modify the programs without the need to disassemble the system or replace the microcontroller.

In step 401, DO SENSOR CALIBRATION checks the dry state of the humidity capacitor to permit calculation of the DEW threshold. In the preferred embodiment of the present invention, oscillator 303 is operating at 20 kilohertz.

Using a potentiometer, for example a trimmer pot, oscillator 303 frequency is calibrated to the capacitance of the humidity capacitor and the oscillation frequency can vary over the range of 7 to 37 KHz when the humidity capacitor is connected to node 306 via capacitor C1. It is set to 20 KHz under dry conditions. Long term oscillator drift can be automatically calibrated out by counting the number of pulses per second with respect to the microcontroller PIC16C71's internal real-time clock (crystal controlled).

With the dry frequency established, a 4 bit code set by switches SW1, SW2, SW3 and SW4 is used to determine the amount of capacitance, and therefore, the amount of oscillator frequency reduction that is needed to indicate the formation of DEW on the humidity capacitor. The calibration routine determines the current dry frequency, reads the DIP switches for dew threshold selection and computes the actual frequency drop needed to detect dew formation. Since there is a correlation between the frequency drop and the capacitance increase, reading the frequency drop allows the control routine to determine the capacitance drop.

In step 403, humidity capacitor thermoelectric cooler 105 is turned on by microcontroller 101 and starts to cool one side of capacitor 103. In step 405, WAIT FOR DEW DETECTION monitors the oscillator frequency until it drops to the DEW threshold frequency. At the same time, a time-out counter will cause a termination of the wait mode if DEW is not detected with predetermined time limits.

After a predetermined period of time, a determination is made in step 407 as to whether DEW has been detected or a time-out has occurred. If it is a time-out, there has been no dew formation and control routine causes a status LED (light-emitting-diode) to turn on to indicate the DEW was never detected and goes to step 411.

If there has been dew formation, step 411 turns off thermoelectric cooler 105 and stops cooling of capacitor 103.

In step 413, microcontroller 101 takes an input from line 118 to get the cabinet air temperature and an input from line 112 to get the humidity capacitor surface temperature. Microcontroller 101 also reads the HUMIDITY SET-POINT potentiometer 113. This control can be on the circuit board or mounted with an indicator (% humidity) for the user to adjust as shown in FIG. 1. Humidity is determined by an algorithm that compares the current air temperature with the dew point temperature.

Figure 5:
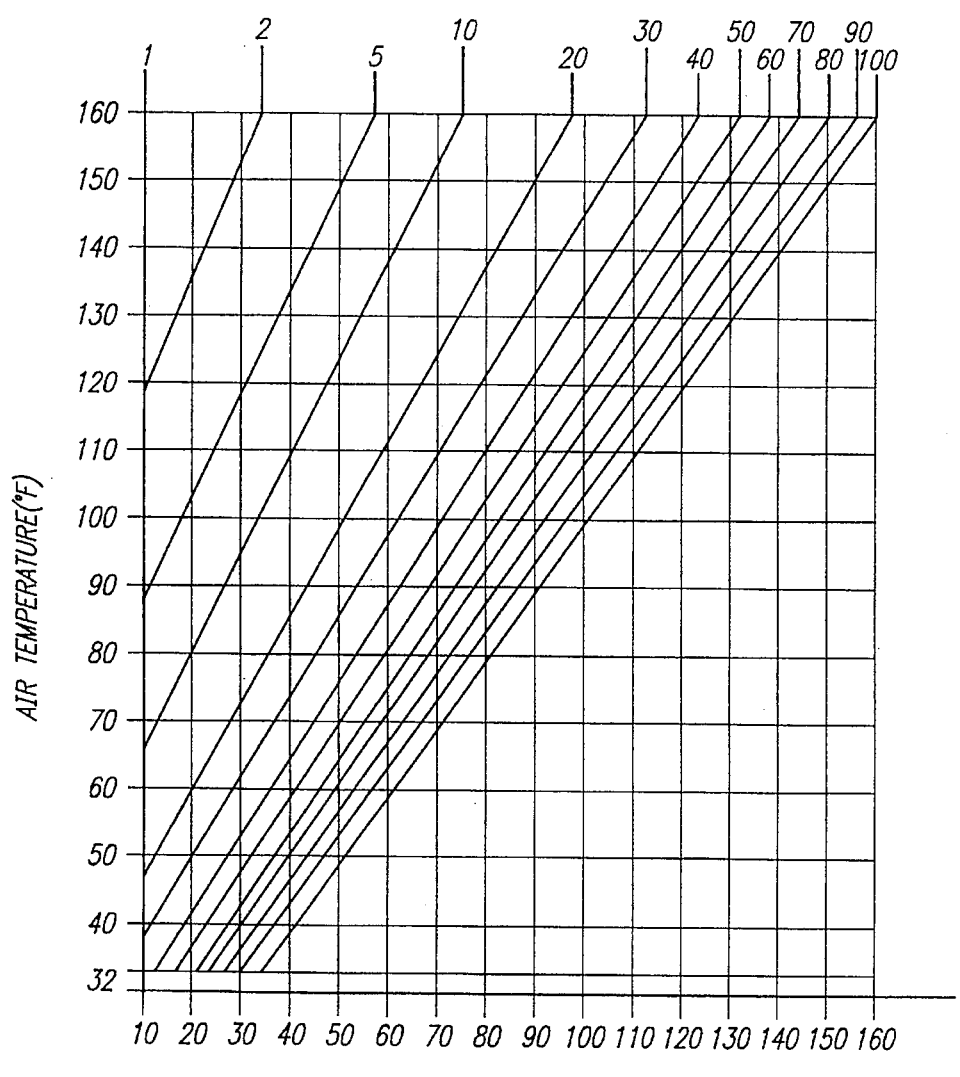
FIG. 5 is a graph showing relative humidity as a function of ambient and dew temperatures.

The relative humidity of the cabinet air can be obtained from the two temperatures by using any well-known formula such as the one taken from ASHRAE (American Society of Heating, Refrigerating, and Air Conditioning Engineers, Inc.) Handbook and Product Directory, Fundamentals. FIG. 5 shows such formulae tabulated according to the air temperature and the dew temperature. From the dew point temperature on X-axis and the cabinet air temperature on Y-axis, relative percent humidity can be obtained by reading the value off the graph at the intersection of the two temperatures in FIG. 5. The graph of FIG. 5 is implemented in the microcode of microcontroller memory and the microcode calculates relative humidity using two temperature inputs.

Step 415 determines if the actual humidity is below the value of the preset-point. If not, no action is taken. If the actual humidity is below the value of the preset-point, microcontroller 101 energizes and turns on relay RL2 303 that supplies water to mister 121. Water spray interval of mister 121 is controlled by a software timer in the microcode of microcontroller 101. After each spray interval, the humidity capacitor is rechecked for proper humidity. The software timer also serves as a safety to prevent continuous water flow due to a malfunction.

In step 419, microcontroller 101 waits for a period of mister spray time interval. After spraying water into cabinet air flow for a predetermined spray interval, microcontroller 101 de-energizes and turns off relay RL2 to stop the flow of water to mister 121 in step 421.

In step 423, microcontroller 101 waits for a new test cycle to begin and determines the amount of time lag between humidity check operations. A determination is made in step 425 as to whether the humidity capacitor has dried out before initiating a new humidity testing routine. The oscillator frequency must return to or almost to the value found during the sensor calibration operation, for example 20 KHz in the preferred embodiment of the present invention.

If the humidity capacitor is not dry, microcontroller 101 causes LED D1 to flash, indicating a wet humidity capacitor condition. A new humidity measurement routine cannot begin until the humidity capacitor is dry. The program returns to Wait for New Test Cycle in step 423 to allow for extra drying time. The humidity capacitor is re-tested until it is dry before performing a new humidity test routine.

Those skilled in the art will appreciate that in the humidity control routine, various of the above-referenced parameters, which are predetermined and coded into microcontroller memory in the preferred embodiment of the present invention, can be recoded to accommodate different climatic or other requirements for different heated holding cabinets. For example, when it is desired to change the period of humidity check routine cycle, the software timer module can be easily reprogrammed to adjust the humidity check cycle period. Another example is the water spray interval, which is easily changed by modifying and reprogramming the software timer module of the humidity control routine in the program memory.

To accurately sense the frequency shift in response to a cabinet humidity change, a sensing oscillator circuit is necessary to determine actual performance characteristics. The humidity capacitor is connected via 6 feet or less of standard shielded audio cable. The capacitance of this cable does not exceed 28 picofarads per foot for a total of 168 picofarads. 58 picofarads is typical value for a dry condition of the humidity capacitor.

Table 1 shows an example of the correlation observed between the frequency decrease and the capacitance change as a result of dew formation on the humidity capacitor surface.

TABLE 1

| Humidity Capacitor Capacitance Change | Oscillator Frequency Shift |
|---|---|
| 0 pF | 0 Hz |
| 4.7 pF | −30 Hz |
| 47 pF | −276 Hz |
| 100 pF | −600 Hz |
| 200 pF | −1120 Hz |

From Table 1, it is seen that the present invention provides a high resolution, high accuracy, non-destructive method for detecting humidity changes by correlating humidity capacitor capacitance change to oscillator frequency shift. When the humidity capacitor capacitance changes due to a humidity change, oscillator frequency can be monitored instead of the humidity capacitor capacitance, thereby eliminating the need for direct capacitance measurement. Thus, an amount of frequency change can be selected that corresponds to a dew threshold capacitance point. The sensing sensitivity can be calibrated to accurately detect the dew formation temperature by selecting an appropriate dew threshold frequency value.

In alternate embodiments of the invention, other suitable methods can be used to measure cabinet humidity. For example, an air sample can be taken out of a heated holding cabinet and cooled. Humidity can be measured of the air sample to determine the moisture content of the air. Then it can be determined how much moisture should be introduced into the heated holding cabinet to increase the humidity to a desired level.

It is understood that particular embodiments described herein should not limit the present invention thereby. This invention can be practiced in connection with any substantially closed environment other than heated food cabinets. For example, the present invention can be used to control humidity in offices and residential suites.

Thus, a humidity control system has been described, which is applicable to control humidity in any closed environments including heated food cabinets, offices, and rooms where it is necessary to provide a cost effective and high temperature safe humidity control system.

We claim:

1. Apparatus for measuring humidity in a cabinet, said apparatus comprising:
    a capacitor having two spaced electrically conductive plates;
    means to cool a selected plate of one of said two plates;
    means to measure a change in a capacitance of said capacitor in response to cooling said selected plate;
    means to convert said change in said capacitance to a humidity value.

2. The apparatus of claim 1 further comprising means to increase said humidity to a desired value in said cabinet.

3. The apparatus of claim 2 wherein said means to increase said humidity comprises means to discharge a liquid into air flow inside said cabinet.

4. The apparatus of claim 3 wherein means to discharge a liquid is a water mister.

5. The apparatus of claim 1 further comprising oscillating means to provide a reference frequency, said oscillating means coupled to said capacitor so as to cause said reference frequency to change in response to changes in said capacitance.

6. The apparatus of claim 5 further comprising means to detect when said reference frequency reaches a dew threshold frequency.

7. The apparatus of claim 6 further comprising means to adjust said dew threshold frequency.

8. The apparatus of claim 1 wherein said means to cool is a Peltier-effect thermoelectric module.

9. The apparatus of claim 1 wherein said plates are made of aluminum.

10. The apparatus of claim 1 further comprising means to adjust said humidity value.

11. A humidity control system for heated holding cabinet comprising:
    a capacitive humidity sensor comprising:
        a capacitor with two plates forming electrodes;
        means to cool a selected one of said two plates;
        a thermometer attached to said selected one of said two plates;
    means to detect a change in capacitance of said capacitor due to formation of moisture on said selected plate;
    means for correlating said change in said capacitance to humidity of said cabinet;
    a humidifier coupled to said humidity sensor, wherein said humidifier to increases humidity of said cabinet to a desired value.

12. The apparatus of claim 11 wherein said means to detect a change in capacitance comprises oscillating means coupled to said capacitor to provide a reference frequency, wherein said reference frequency changes in response to said change in said capacitance.

13. The apparatus of claim 11 wherein said humidifier is a water mister.

14. The apparatus of claim 11 wherein said means to cool said plate is a Peltier-effect thermoelectric module.

15. The apparatus of claim 11 wherein said plates are made of aluminum.

16. The apparatus of claim 11 further comprising means to adjust said humidity.

17. The apparatus of claim 11 further comprising a microcontroller to control and monitor said humidifier and said humidity sensor.

18. Method for humidity control in a food containing heated cabinet, said cabinet comprising a capacitive humidity sensor and a humidifier, said method comprising the steps of:
    cooling said humidity sensor to cause moisture condensation on said sensor;
    monitoring a capacitance of said humidity sensor to detect when said capacitance reaches a predetermined value in response to cooling;
    converting said predetermined value to a humidity value;
    activating said humidifier to increase said humidity.

19. The method of claim 18 further comprising the step of correlating capacitance of said capacitive humidity sensor to a reference frequency provided by a oscillating means coupled to said capacitive humidity sensor.

20. The method of claim 19 further comprising the step of monitoring said reference frequency to detect when said reference frequency reaches a predetermined threshold value.

21. The method of claim 20 further comprising the step of adjusting said reference frequency predetermined threshold value.

* * * * *